(12) United States Patent
Cheng et al.

(10) Patent No.: US 8,234,931 B2
(45) Date of Patent: Aug. 7, 2012

(54) KARMAN VORTEX FLOWMETER ASSEMBLY COMPRISING A FIBER BRAGG GRATING SENSOR AND METHOD TO MEASURE A FLUID FLOW RATE

(75) Inventors: Lun Kai Cheng, Krimpen A/D Ijssel (NL); Marinus Carolus Adrianus Maria Peters, Breda (NL); Wouter Schiferli, Den Haag (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 252 days.

(21) Appl. No.: 12/520,511

(22) PCT Filed: Dec. 18, 2007

(86) PCT No.: PCT/NL2007/050665
§ 371 (c)(1),
(2), (4) Date: Sep. 18, 2009

(87) PCT Pub. No.: WO2008/078996
PCT Pub. Date: Jul. 3, 2008

(65) Prior Publication Data
US 2010/0018323 A1    Jan. 28, 2010

(30) Foreign Application Priority Data
Dec. 22, 2006 (EP) ..................................... 06077315

(51) Int. Cl.
*G01F 1/32* (2006.01)
(52) U.S. Cl. .................................. 73/861.24; 73/861.22

(58) Field of Classification Search .................. None
See application file for complete search history.

(56) References Cited

U.S. PATENT DOCUMENTS

| | | | |
|---|---|---|---|
| 3,979,954 A | | 9/1976 | Ide et al. |
| 4,358,678 A | * | 11/1982 | Lawrence ................. 250/227.14 |
| 4,372,165 A | * | 2/1983 | Pitt et al. ...................... 73/861.22 |
| 4,441,372 A | * | 4/1984 | Barnard ....................... 73/861.22 |
| 4,448,081 A | | 5/1984 | Kolitsch et al. |
| 4,470,310 A | * | 9/1984 | Tsuruoka et al. ............ 73/861.24 |
| 4,472,022 A | * | 9/1984 | Bearcroft et al. ............. 359/298 |

(Continued)

FOREIGN PATENT DOCUMENTS

DE    24 08 246 A1    9/1975

(Continued)

OTHER PUBLICATIONS

"Monomode fibre optic vortex shedding flowmeter", by K. Nagaraj; Electronics Letter, vol. 20, No. 16; Aug. 2, 1984.*

(Continued)

*Primary Examiner* — Harshad R Patel
(74) *Attorney, Agent, or Firm* — Leydig, Voit & Mayer Ltd.

(57) ABSTRACT

An assembly comprising a fluid channel and a flowmeter, the flowmeter (1) comprising at least one vortex shedder (2) extending in the channel (C), each vortex shedder (2) being configured to generate Karman vortices (V) in fluid flowing through the channel (C) during operation, wherein each vortex shedder (2) is provided with a first fiber Bragg grating (FBG) of a fiber Bragg grating sensor (3, 7, FBG), wherein a Karman vortex frequency (fe) of the vortices (V) generated by the vortex shedder (2) is detectable utilizing a fiber Bragg grating (FBG) sensor signal relating to the respective first fiber Bragg grating (FBG) of that vortex shedder (2).

25 Claims, 5 Drawing Sheets

U.S. PATENT DOCUMENTS

| | | | | |
|---|---|---|---|---|
| 4,475,405 A | * | 10/1984 | Corpron et al. | 73/861.24 |
| 4,594,504 A | * | 6/1986 | Coursolle et al. | 250/227.21 |
| 4,648,280 A | * | 3/1987 | Miyoshi et al. | 73/861.24 |
| 4,679,445 A | * | 7/1987 | Knudsen et al. | 73/861.24 |
| 4,742,574 A | * | 5/1988 | Smith et al. | 398/37 |
| 4,806,016 A | * | 2/1989 | Corpron et al. | 356/620 |
| 4,864,868 A | * | 9/1989 | Khalifa | 73/861.24 |
| 4,891,990 A | * | 1/1990 | Khalifa et al. | 73/861.24 |

FOREIGN PATENT DOCUMENTS

| | | |
|---|---|---|
| DE | 127 531 A1 | 9/1977 |
| EP | 0 809 088 A1 | 11/1997 |
| JP | 2003 287451 A | 10/2003 |

OTHER PUBLICATIONS

"A compact fiber-optic flow velocity sensor based on a twin-core fiber Mechelson Interferometer", by Yuan et al. IEEE Sensor Journal, vol. 8, No. 7; Jul 7, 2008.*

"Vortex Shedding fluid flowmeter using optical fibre sensor" Electronics Letter, vol. 17, No. 6; Mar 19, 1981.*

International Search Report for PCT/NL2007/050665 dated Feb. 22, 2008.

Takashima et al., "A water flowmeter using dual fiber Bragg grating sensors and cross-correlation technique," *Sensors and Actuators*, 116(1): 66-74 (Oct. 4, 2004).

Zhao et al., "Novel target type flowmeter based on a differential fiber Bragg grating sensor," *Measurement*, 38: 230-235 (Oct. 2005).

* cited by examiner

KARMAN VORTEX FLOWMETER ASSEMBLY COMPRISING A FIBER BRAGG GRATING SENSOR AND METHOD TO MEASURE A FLUID FLOW RATE

FIELD OF THE INVENTION

The invention relates to an assembly comprising a fluid channel and a flowmeter, and a method to measure a fluid flow rate.

BACKGROUND

In oil/gas wells, water or steam is often injected into the oil/gas field to increase production. It is desired to provide information about the flow conditions in the water/steam injection lines available. However, there are only a limited amount of flow meters available for downhole applications which are very expensive, bulky and complex, see for example the system described in U.S. Pat. No. 6,691,584 B2.

Besides, JP200387451 (Hishida Yasuyuki) describes an optical flow-velocity sensor, wherein a flow induced bending of a flexible detecting rod bending in the direction of the flow is being detected using fiber Bragg gratings. Calibration of this sensor will be relatively hard due to its configuration, since the dependency between bending and flow rate is non-linear, and, moreover, an additional Bragg grating is required to provide for temperature compensation. Besides, this sensor is not very accurate due to the type of measurement (measuring strain using the amplitude of a FBG reflected sensor signal) and since the flexibility of the rod may change over time, leading to a drift in the measurement over time. Besides, this sensor is not sufficiently suitable to be used in downhole applications.

SUMMARY OF THE INVENTION

The present invention aims to solve these problems. Particularly, the present invention aims to provide an assembly and method, wherein fluid flow rate can be measured accurately, preferably over a relatively broad range, using relatively inexpensive, compact and durable means.

To this aim, according to an embodiment of the invention, the assembly is characterised by the features of claim 1.

Advantageously, the flowmeter comprising at least one vortex shedder extending in the channel, each vortex shedder being configured to generate Karman vortices in fluid flowing through the channel during operation, wherein each vortex shedder is provided with a first fiber Bragg grating (FBG) of a fiber Bragg grating sensor, wherein a Karman vortex frequency of the vortices generated by the vortex shedder is detectable utilizing a fiber Bragg grating sensor signal relating to the respective first fiber Bragg grating of that vortex shedder. Also, for example, by multiplexing of several FBG flow sensors, a sensor array using a single lead fiber can be provided.

It has been found that the present assembly can provide highly accurate flow rate measurement results that reproduce very well. Also, the flowmeter of the present assembly particularly the vortex shedder and respective fiber Bragg grating part) can be made compact and durable, whereas the flowmeter can also be provided by relatively inexpensive means.

A basic idea behind the present invention is, that the fiber Brag grating part of the flowmeter can simply be integrated with the Karman vortex shedder. The flowmeter can still accurately determine fluid flow speed, by deducing the Karman vortex frequency from the sensor signal, relating to the respective fiber Bragg grating. The Karman frequency provides a very reliable measure for the flow speed, since that frequency and the fluid flow speed are generally linearly dependent on one another, particularly in certain fluid rate ranges that are common in downhole applications. Besides, the FBG sensor signal can be processed using relatively simple processing means, to find the Karman frequency as detected by a single respective FBG.

The use of fiber Bragg gratings in water flowmeters as such is known from the publication "A water flowmeter using dual fiber Bragg grating sensors and cross-correlation technique", Shoichi Takashima et al. Sensors and Acuators A 116 2004 pp. 66 (Elsevier). However, this publication leads away from the present invention by teaching to apply at least two separate cantilever FBG sensors located downstream of a Bluff body, wherein respective sensor signals are required to be cross-correlated to detect a time delay and wherein the flow velocity follows from the distance between the two FBG sensors and the time delay. This known systems is expensive, complex, prone to mechanical malfunctions, takes in much space and thus also difficult to mount. Besides, this system can only detect flow rates of fluid flowing in one direction.

Besides, according to an embodiment, there is provided a flowmeter of the assembly according the invention, the flowmeter being specifically adapted to measure a fluid flow rate in a fluid channel by determining the Karman vortex frequency of vortices shed by the at least one vortex shedder during operation, utilizing at least one respective fiber Bragg grating sensor signal relating to the respective first fiber Bragg grating of that vortex shedder. The flowmeter is well adapted to the extreme conditions (high temperature and pressure) of downhole applications, since the Bragg grating sensor can avoid the use of electronics downhole.

Also, there is provided a method for measuring a fluid flow rate, of fluid flowing through a channel. The method can, for example, utilise a flowmeter according to the invention, and particularly comprises:

providing at least one vortex shedder in the channel, each vortex shedder shedding Karman vortices in the fluid flowing through the channel;

providing the vortex shedder with a fiber having at least one first fiber Bragg grating, the grating being configured to reflect an optical signal of a certain wavelength depending on an amount of strain to which the grating is being subjected, wherein fluid pressure variations that result from the Karman vortices lead to a varying strain being subjected to the respective fiber Bragg grating;

transmitting an optical signal into the fiber, the signal having a wavelength to be at least partly reflected by the first fiber Bragg grating in the case that the grating is being subjected to a predetermined amount of strain, for example no strain;

detecting the optical signal that is reflected by the first fiber Bragg grating of the vortex shedder; and processing the detected optical signal to determine the fluid flow rate from the variations of the detected signal.

Preferably, the method includes the measuring of surface strain variations of a surface part of the vortex shedder, utilizing the fiber Bragg grating.

BRIEF DESCRIPTION OF THE DRAWINGS

Further advantageous embodiments of the invention are described in the dependent claims. These and other aspects of the invention will be apparent from and elucidated with reference to non-limiting embodiments described hereafter, shown in the drawings.

DETAILED DESCRIPTION OF THE DRAWING

Similar or corresponding features are denoted by similar or corresponding reference signs in the present application.

FIGS. 1-6 depict a non-limiting embodiment of an assembly comprising a fluid channel C and a flowmeter 1.

The fluid channel C (for example a fluid line, pipe, conduit) can be configured to conduct a fluid, for example a gas, gas mixture, air, liquid, liquid mixture, water, steam. In a particular embodiment, the channel C can be arranged to inject fluid into a oil or gas field, however, to skilled person will appreciate the channel C can be used in many other applications. In the present embodiment, the channel C has a substantially circular cross-section having a diameter (width) W. The channel can also have different configurations, for example having a rectangular or square cross-section, or a different cross-section, as will be appreciated by the skilled person.

The flowmeter 1 is configured to measure fluid flow rate of fluid flowing through the channel C during operation. To this aim, the flowmeter 1 comprises at least one vortex shedder 2 (only one being shown in the present drawings) extending in the channel C. In a further embodiment the assembly has a plurality of spaced-apart vortex shedders 2, to detect flow rates at different locations in the channel C. In that case, flow rate profiles can be detected with the flowmeter 1, for example to determine or estimate amounts of fluid that are being injected in certain parts (layers) of an oil or gas field. For example, the shedder 2 can extend substantially in the channel (see the drawing), or partly, as will be appreciated by the skilled person.

Figure 3:
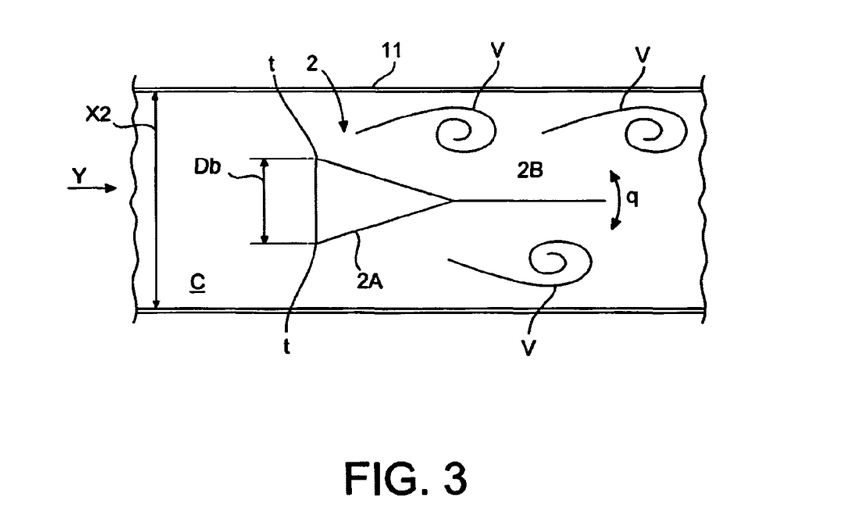
FIG. 3 shows a longitudinal, schematic, cross-section over line III-III of FIG. 1.

Each vortex shedder 2 is configured to generate Karman vortices V in fluid flowing through the channel C during operation (see FIG. 3). A fluid flow direction is indicated in FIG. 3 by arrow Y. Particularly, each vortex shedder 2 comprises a bluff body 2, having two vortex separation edges t, preferably substantially parallel, sharp lateral edges. The bluff body 2 can be arranged to have these edges t located at upstream positions with respect to a remaining bluff body part (as in FIG. 3), or alternatively at downstream positions (for example, in case the flow direction in FIG. 3 has been reversed). In the present embodiment, the bluff body 2 is rigidly attached to a channel wall 11.

Particularly, the flow meter 1 is based on the principle of vortex shedding on an obstacle (bluff body 2) placed in the flowing fluid (see FIG. 3). A boundary layer can grow on both sides of the bluff body 2 because of viscosity and can separates at separation points, provided by the edges t. During operation, the vortices V can separate alternately on both sides of the body 2, with a vortex shedding frequency $f_K$. As is known from the prior art, the vortex shedding frequency $f_K$ is proportional to the flow velocity U, according to the following equation 1:

$$f_K = St(U/D_b) \quad (1)$$

wherein St is the dimensionless Strouhal number, U is the flow velocity (m/s) and $D_b$ is the diameter/width of the bluff body (m). As is commonly known, the Strouhal number St is characteristic for a certain bluff body shape and is constant in a relatively large range of the Reynolds number, so that the relation between flow rate (m/s) and shedding frequency is linear over a wide flow rate range. For example, the present embodiment can be used in the case of flow velocities are in the range of 0.5 to 5 m/s (turndown 1:10), and for example can have operation temperatures ranging from 20 to 350 degrees Celsius, at various operating pressures. Also, the meter 1 can be configured to be used outside these velocity and temperature ranges, as will be appreciated by the skilled person. The boundary layer can be controlled by choosing the shedder body 2 on which the separation points are defined exactly, by introducing sharp edges t on the body 2.

The bluff body 2 can be made of various materials. For example, the bluff body 2 can be made of rigid, corrosive resistant material, particularly a suitable metal, alloy, steel or rigid plastic, reinforced plastic, for example stainless steel, or aluminium (stainless steel is preferred for downhole applications for durability reasons), and/or other suitable materials FIGS. 4-7 show an advantageous embodiment of a bluff body/shedder configuration in more detail. To have a linear relation between the flow velocity and the vortex shedding, the present vortex shedding body 2 provides well-defined separation lines (edges) t, and has a substantially T-shaped cross-section. To this aim, particularly, the shedder 2 has been provided with a first part 2A (i.e. the top of the T of the T-shape) and a second part 2B (i.e. the centre line of the T of the T-shape), the first part having the two separation edges t and the second part being a fluid dividing element 2B.

Both the first and second shedder body parts 2A, 2B can have various configurations. The first and second shedder part 2A, 2B are preferably made of the same material, however, this is not necessary.

Advantageously, the first shedder body part 2A is a rigid, preferably substantially solid part 2A that is rigidly fixed (i.e. substantially unmovably during operation) to the wall 11 of the channel C. The first shedder body part 2A comprises a front surface, extending substantially transversally with respect to a longitudinal channel direction (i.e. flow direction Y of fluid flowing through the channel C during use), wherein the lateral sides of the front surface are the vortex separation lines t of the shedder 2.

In the present embodiment, the length L1 of the first shedder body part 2A is substantially or nearly equal to the flow channel diameter/width X1 (see FIG. 1), so that the walls of the channel C act as end plates for the flow separation edges t (i.e., opposite ends of each flow separation edge t are located at or close to respective channel wall parts of channel wall 11). Thus, the first part 2A of the bluff body 2 extends from a first inner wall part 11a of the channel C to an opposite second inner wall part 11b of the channel C, as in FIG. 1-2, and preferably centrally through the channel C. Herein, for example, a narrow slit can still extend between an end of the bluff body 2 and the channel wall, for example a slit Z having a width of about 1 mm or smaller as has been indicated in FIG. 1.

For example, in a durable configuration, the first shedder body part 2A can be firmly fixed at one end (or alternatively at both ends) to a channel wall part (or wall parts), for example by clamping, adhesive, welding, suitable couplings, bolting, detachably, a combination thereof, and/or in a different manner. In the present embodiment, one end of the first shedder body part 2A is attached to a mounting structure 9 that has been firmly joined to the first channel wall part. For example, the mounting structure can include a first mounting part 9a to hold the bluff body 2, a second mounting part 9b that is attached to the first part 9a via three first bolts 13a, being spaced-apart from each other in a triangle configuration, and a third mounting part 9c that interconnects the mounting second part 9b to the channel wall 11. Besides, the channel wall 11 can comprise an opening 12 for introducing the bluff body 2, being held by the first mounting part 9a, into the channel C. The mounting structure 9 can be configured to provide a fluid tight sealing of the opening 12 after mounting.

In another embodiment, the length L1 of the respective bluff body part 2A, can be significantly smaller than the flow channel diameter/width X1, wherein the bluff body 2 can comprise one or more end plates, extending laterally with respect to the vortex separation edges t, for controlling the boundary layer on the bluff body 2.

Figure 1:
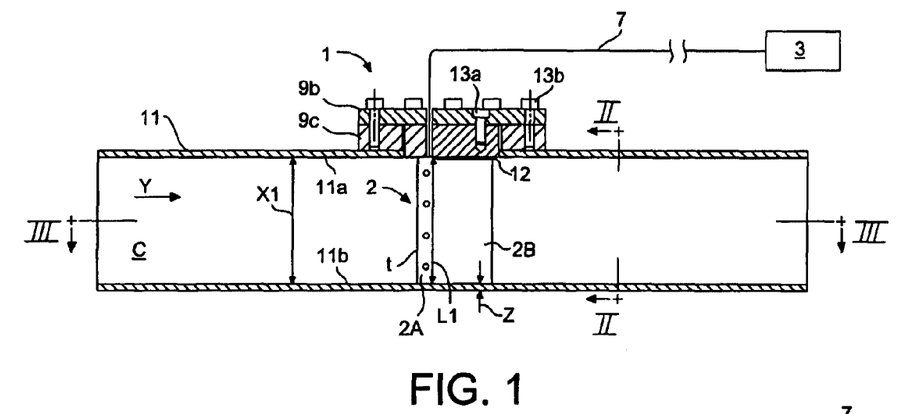
FIG. 1 depicts a longitudinal cross-section of an embodiment of the invention.
Figure 2:
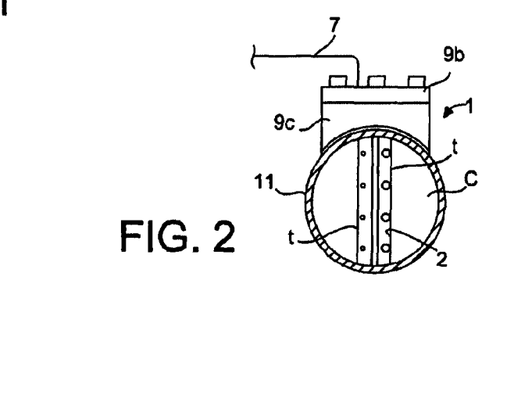
FIG. 2 depicts a cross-section over line II-II of FIG. 1.

In a further embodiment (see FIG. 3), the distance $D_b$ between the two vortex separation edges (lines) t, measured transversally with respect to a longitudinal channel direction, is larger than a tenth of a width X2 of the fluid channel C, measured in the same direction, for example about a fourth of the width of the fluid channel C, wherein the mentioned distance $D_b$ between the two vortex separation edges is preferably smaller than half the width X2 of the channel C. Since in the present embodiment, the channel C has a circular cross-section, the last-mentioned channel width X2 is equal to the above-mentioned channel width that is indicated in FIG. 1 with arrow X1.

A longitudinal cross-section of the first shedder body part 2A is preferably substantially triangular (as in FIG. 3, 7) or truncated triangular, or can have another shape.

Preferably, the second shedder part 2B has a panel-like, strip-like or sheet-like configuration, having a substantially rectangular shape (such as in the present embodiment). For example the second shedder part 2B can be dimensioned such in three orthogonal directions, that one orthogonal direction (the thickness K) is significantly smaller (for example by a factor of at least 50) than each of the second and third orthogonal directions (length L2 and width G).

Also, preferably, the second shedder part 2B extends substantially in longitudinal channel direction and has two fluid pressure receiving surfaces, being faced away from each other, that are configured to alternatively receive vortex induced pressure variations during operation (see FIG. 3), and to be strained by those pressure variations. In the present embodiment, particularly, the pressure variations cause a vibration and/or deformation the second shedder part 2B that is perpendicular to the flow direction Y (in other words: vortex induced deformation and/or vibration of the shedder part 2B will mainly be in lateral directions of that part 2B, and is indicated by double arrow q in FIG. 3, i.e. vibration and/or deformation that is substantially perpendicular to the pressure receiving surfaces of that shedder part 2B), the deformation and/or vibration leading to surface strain in the second shedder part 2B.

In the present embodiment, the second shedder part 2B extends centrally with respect to the first shedder part 2A, perpendicularly with respect to the bluff body surface containing the two separation edges t, and preferably centrally through the channel C after mounting. For example, the external contours of the bluff body, including the first and second part 2A, 2B) can be substantially mirror-symmetric with respect to a longitudinal central mirror plan, as in the present embodiment.

Figure 5:
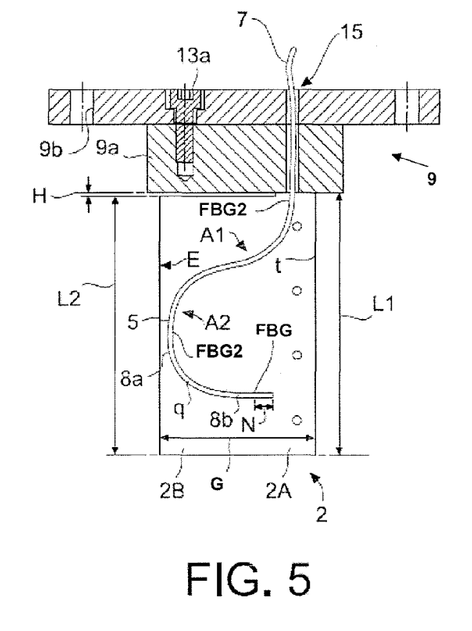
FIG. 5 is a longitudinal cross-section of the shedder shown in FIG. 4.
Figure 6:
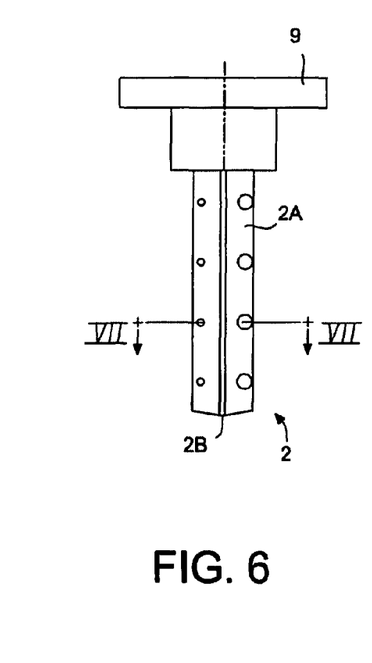
FIG. 6 is a front view of the shedder of FIG. 4.

In the present embodiment, one transversal side (a lower side of that part in FIG. 5) of the second shedder part 2B extends flush with the respective side of the first shedder part 2A (see FIG. 5). The other transversal side of the first shedder part 2B, however, is spaced-apart from the mounting structure 9 (see FIG. 5), the distance there-between being indicated by an arrow H in FIG. 5.

The second shedder part 2B is a pressure variation receiving part 2B, or straining part, that is configured to receive vortex induced pressure variations during operation. Particularly, the Karman vortices can induce strain variations in the second shedder part 2B (indicated by the arrow q in FIG. 3), and more particularly in surface parts thereof (i.e. vortex induced pressure variations during operation lead to surface strain in/of the second shedder part 2B). For example, the second shedder part 2B can be slightly elastically deformable during operation, such that this shedder part 2B performs small oscillations q during operation due to receiving vortex related pressure variations, the small oscillations q leading to a varying straining of the two lateral (pressure receiving) surfaces of the second shedder part 2B. It has been found that these strain variations are particularly relatively high at a region that abuts the first shedder part 2A (i.e a junction with the first shedder part 2A).

In a further embodiment, the pressure variation receiving part (i.e. second part) 2B of the shedder 2 comprises two transversal sides that are spaced-apart from opposite longitudinal flow restriction parts (that include a channel wall part for one transversal shedder side, and a mounting structure part for the other transversal shedder side, in the present embodiment). For example, in FIG. 1, a distance Z between the (in the drawing) lower transversal side of the rectangular vortex shedder part 2B and the channel wall 11 is preferably in the range of about 0.1-10 mm, particularly about 1-2 mm, and the width H of the slit between the (in FIG. 1) upper transversal side of the rectangular vortex shedder part 2B and a surface of the first mounting part 9a is also preferably in the range of about 0.1-10 mm, particularly about 1-2 mm. Therefore, the transversal sides of the second shedder part 2B are free from opposite flow restricting surfaces, such that vortex induces pressure variations can lead to surface strain variations in and/or oscillations of the second shedder part 2B. Particularly, the vortex induced pressure variations can induce vibration and/or deformation of the vortex shedder, which vibration and/or deformation can cause the surface strain.

Thus, preferably, the length L2 of the second shedder part 2B (measured in parallel direction with respect to the separation lines t) is slightly smaller than the length L1 of the first shedder part 2A, the difference in length being for example in the range of about 0.1-20 mm, particularly in the range of about 1-2 mm (see FIG. 5)

The length L2 of the second shedder part 2B is preferably larger than a width G of an external section (tail section) of that part 2B, the width G being measured in longitudinal channel direction (see FIG. 5; herein, the width G of the second shedder part 2B is the width of the section of that part that extends externally from the first shedder part, and serves as a fluid pressure variation receiving section of the shedder). For example, the length L2 of the second part 2B can be in the range of about 1.5-2 times the mentioned width G of that part 2B. Good results have been found in the case that L2 is in the range of 1.7-1.9 times G, particularly length L2 equals the width G multiplied by 1.8.

Figure 7:
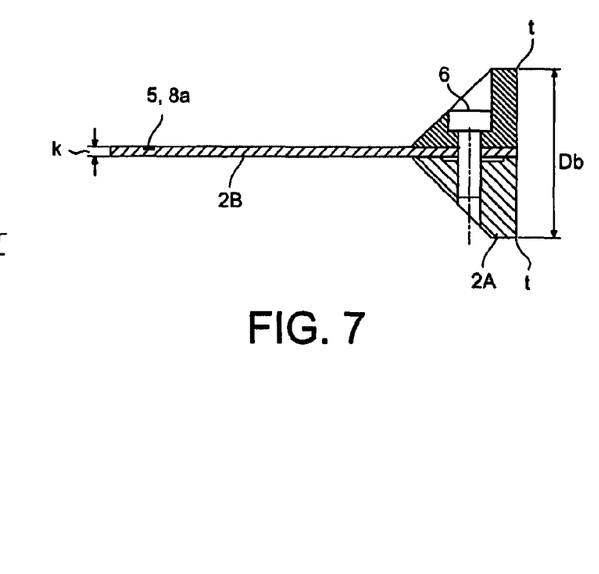
FIG. 7 is a cross-section over line VII-VII of FIG. 6.

Also, it has been found that good results can be obtained in the case that a thickness K of the second shedder body part 2B (measured in its transversal direction) is smaller than about 10 mm, preferably smaller than about 5 mm and particularly in the range of about 1-2 mm (see FIG. 7).

The first and second shedder parts 2A, 2B can be joined to each other in various ways. For example, the first and second shedder parts can be made in one piece. Also, first and second shedder parts 2A, 2B can be interconnected with adhesive, welding, bolting (as in the FIG. 1-7 embodiment, with bolts 6), clamping, force closure fixation, form closure fixation, a combination thereof and/or in a different manner. In the present embodiment, the second shedder part 2B comprises an internal section that extends in the first shedder part 2A to be held thereby, and the above-described external section (having the mentioned width G) that extends outside the first shedder part 2A to perceive vortex induced pressure variations. Preferably, as follows from the drawing, the mentioned external (tail) section of the second shedder part 2B is substantially uninterrupted, providing substantially uninterrupted (continuous) pressure receiving surfaces.

Preferably, the first and second shedder parts 2A, 2B are configured such that relatively vortex pressure variations can induce relatively large strain variations into a certain area of the shedder (for example the external section of the second shedder part 2B that abuts the first shedder part 2A).

Also, each vortex shedder 2 is provided with a first fiber Bragg grating FBG of a fiber Bragg grating sensor 3, 7, FBG. During operation a Karman vortex frequency $f_K$ of the vortices V generated by the vortex shedder 2 is detectable utilizing a fiber Bragg grating sensor signal relating to the respective first fiber Bragg grating FBG of that vortex shedder 2. Preferably, the first fiber Bragg rating FBG is attached to the section of shedder 2 that experiences relatively large surface strain variations due to vortex pressure variations induced vibration/deformation during operation, and is configured to detect those strain variations.

Also, in a further embodiment the fiber Bragg grating FBG of the respective vortex shedder 2 is arranged to perceive the mentioned pressure variations, particularly via pressure variation induced strain variations of the pressure variation receiving part 2B of the shedder 2, and to vary the respective fiber Bragg grating sensor signal as a result of perceiving the pressure variations. Preferably, the fiber Bragg grating FBG is mounted close to, or extends in, abuts, or is embedded in, a pressure receiving surface of the second shedder part 2B, to be sensitive to the mentioned surface strain that is caused by the deformation/vibration of that shedder part 2B during operation.

Advantageously, the first fiber Bragg grating FBG is spaced-apart from a vortex separation surface (which surface contains the two vortex separation lines t) of the respective vortex shedder 2. Also, preferably, the location of the first fiber Bragg grating FBG is spaced-apart from the two transversal sides of the second shedder part 2B.

Besides (a follows from FIG. 5), a longitudinal direction of the first fiber Bragg grating FBG preferably encloses an angle smaller than 90° with a fluid flow direction during operation, for example an angle smaller than 30° and preferably an angle smaller than 5°. In the present embodiment, the angle between the longitudinal direction of the first fiber Bragg grating FBG and the fluid flow direction Y is about 0°.

Figure 4:
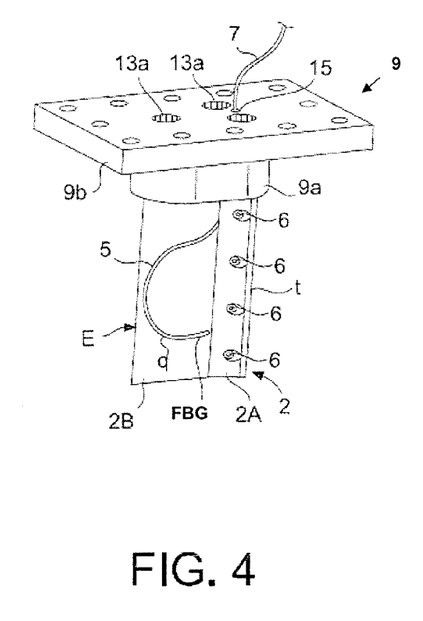
FIG. 4 is a perspective view of a vortex shedder of the embodiment of FIG. 1.

Particularly, the pressure variation receiving part/second shedder part 2B integrally comprises a curved fiber part 8, extending at least partly along a curved path and containing the first fiber Bragg grating FBG (see FIG. 4-5). A first section 8a of the curved fiber part 8 preferably extends a short distance from a free shedder edge E that is faced away from a vortex shedding surface of the vortex shedder 2, in a substantially orthogonal direction with respect to a longitudinal channel direction (see FIG. 5). A second section 8b of the fiber part 8 is preferably located near a vortex shedding surface of the vortex shedder 2 and extends substantially parallel to the longitudinal channel direction. In the present embodiment, this second fiber section 8b comprises the first fiber Bragg grating FBG. Particularly, the curved path of the fiber part, being provided on/in the shedder 2, comprises a first bend A1 to lead the fiber from an entry location at the first shedder part 2A towards the free shedder edge E, and a subsequent second bend A2 (having a bend direction that is opposite to the bend direction of the first bend) to lead the fiber from the free shedder edge E back to the first shedder part 2A to a Bragg grating location that is spaced-apart from the entry location.

In a further embodiment (not shown) the fiber can be bended further (for example to make a substantially full loop along and/or through the vortex shedder 2), and can be guided back towards the channel wall 11 and through the holding structure 9, for example to be led to another vortex shedder 2 to provide another first Bragg grating in/at that other shedder 2. In that case, fiber the entry location (point) can also provide a fiber exit location.

Particularly, in the present embodiment, the mounting structure 9 comprises a through-hole 15 (see FIG. 5) to pass the fiber 7 from an area outside the channel C to the vortex shedder 2. The first shedder part 2A can comprise a similar aperture to receive part of the fiber 7. The second shedder part 2B can comprise a curved groove 5 or aperture to hold the curve fiber part 8 containing the first fiber Bragg grating FBG. I a further embodiment, the through-hole 15 can also be used to guide the fiber 7 from the vortex shedder 2 again out of the channel, through the channel wall 11, to another location, for example to another vortex shedder (not shown).

For example, the fiber receiving groove 5 of the shedder 2 can have a depth smaller than the thickness K of the second shedder part 2B, for example a depth smaller than 1 mm, for example about 0.4 mm. For example, depth of the fiber receiving groove 5 can be smaller than half the thickness K of the second shedder part 2B to locate the grating FBG close to and/or in a lateral surface of that part 2B. Preferably, the curved fiber part 8 is substantially embedded in the respective shedder part 2B. The optical fiber part 8 having the Bragg grating FBG can be attached to the respective groove 5, using a suitable adhesive, for example a thermally curable resin, epoxy, or other type of adhesive. Preferably, the fiber receiving groove 5 is configured to hold the respective fiber part substantially snuggly. In a non-limiting embodiment, a width of the groove 5 can be about 1 mm.

Similarly, the assembly can be of a modular configuration, wherein the assembly can include a plurality of vortex shedders 2, each shedder 2 preferably being provided with a mentioned first fiber Bragg grating FBG of the fiber Bragg grating sensor. In that case, a single fiber 7 can simply be provided with all of the first fiber Bragg gratings FBG of the various shedders 2, wherein the fiber 7 can extend from one shedder to the other to transmit the sensors signals.

The operation of a fiber Bragg grating sensor as such is known to the skilled person. In an embodiment, each fiber Bragg grating FBG is configured to substantially reflect one specific wavelength of an optical signal, being transmitted towards the grating FGB through the fiber 7, and to substantially transmit all other wavelengths. Herein, the wavelength of the reflected light depends on the variation of the refractive index in the grating FBG. The reflected wavelength is called the Bragg wavelength $\lambda_b$ and given by:

$$\lambda_b = 2 n_{\mathit{eff}} \Lambda \qquad (2)$$

wherein $n_{\mathit{eff}}$ is the effective refractive index of the optical mode propagating in the fiber 7, and is the period $\Lambda$ of the grating. Strain, temperature and pressure can change the properties of the fiber, and thus the reflected wavelength $\lambda_b$. For example, the amplitude of the sensor signal is a measure of the amount of strain experienced by the grating FBG during operation. In the present embodiment, particularly, the reflected wavelength is used as a measure of the flow velocity, wherein the changes of that wavelength are being detected (i.e. reflected sensor signal amplitude changes), which can be achieved in a relatively simple manner, to determine the above-mentioned Karman frequency $f_K$.

For example the fiber 7 can be a standard optical fiber with one or more Bragg gratings FBG, having a minimum bending radius of about 2 to 3 cm and a grating length N (see FIG. 5), for each Bragg gratings FBG, of approximately 2 cm. As will be appreciated by the skilled person, the fiber 7 can also have a smaller bending radius and/or a shorter grating. For example, advantageously, the length N of the first fiber Bragg grating can be about 1 cm.

In the present embodiment, the first grating FBG is principally used to detect a varying strain in/of the vortex shedder 2, wherein a resulting change in the respective sensor signal can be processed to determine the flow velocity U of the fluid. A preferred location for the first grating FBG is on the beginning of the tail part 2B of the shedder 2, immediately behind the (truncated triangle) second shedder part 2A (see FIGS. 5, 7) since it has been found that during operation, the Karman vortex induced strain variations will be largest on this section of the tail shedder part 2B.

Preferably, the whole first grating FBG can be substantially homogeneously strained during operation, which is achieved by positioning the grating FBG substantially parallel to the longitudinal channel direction. However, in practice, in the present embodiment, the strain does not have to be wholly constant over the whole fiber to obtain accurate measurement results. This is because frequency (i.e. the variation of the amplitude, and not the amplitude as such) is the measured parameter, so that amplitude variations of a detected reflected signal do not effect the outcome of the flow measurement. This is contrary to the device shown in JP200387451, in which case the sensor amplitude signal, of the reflected signal, can have a relatively large error due to inhomogeneous straining of the grating.

The present assembly can include a suitable sensor system 3 (for example comprising one or more suitable processors and/or analyzers), for example a commercially available system of the company Deminsys Commercial, the sensor system being optically coupled to the optical fiber 7. The sensor system 3 can be configured to generate and transmit an optical signal into the fiber 7, the signal having a wavelength (i.e. the above-mentioned Bragg wavelength) to be at least partly reflected by the first fiber Bragg grating FBG in the case that the grating is being subjected to a predetermined amount of strain, for example no strain. In the case that the assembly includes different fiber gratings FBG having different Bragg wavelengths $\lambda_b$, the optical signal can be multiplexed with different signal parts having these different Bragg wavelengths $\lambda_b$, such that the different gratings FBG can be used independently from each other and at the same time, by the sensor system 3.

Also, the sensor system 3 can be configured to detect the optical signal that is reflected by each first fiber Bragg grating FBG of the vortex shedder(s) 2, and to process the detected optical signal(s) to determine the fluid flow rate from the variations of the detected signal(s).

During operation of the embodiment of FIGS. 1-7, the fluid flow will induce a vortex shedding at the shedder 2, which will cause pressure fluctuations on the tail part 2B of the bluff body 2. Because of the pressure fluctuations, the tail will be induced to oscillate, which will lead to fluctuating surface strain of the tail part 2B and thus strain fluctuations of the integral first fiber Bragg grating FBG (being preferably mounted on or close to the respective surface of the second shedder part 2B, to measure that surface strain). The surface strain as result of these oscillations will be measured. This can be simply achieved by the sensor system 3 transmitting an optical signal having the Bragg wavelength FBG of the first fiber Bragg grating of the vortex shedder 2 into the fiber 7, and detecting the respective optical signal that is reflected by the first fiber Bragg grating FBG. The detected optical signal is then processed to detect variations of the detected signal (the variations being the result of the varying strain that is being experienced by the grating FBG), to determine the fluid flow rate from those variations using above equation 1. Thus, a single FBG sensor is applied to detect the flow rate at a certain location in the fluid channel C, wherein—for example—no complex cross-correlation of different grating sensor signals has to be carried out.

Figure 8:
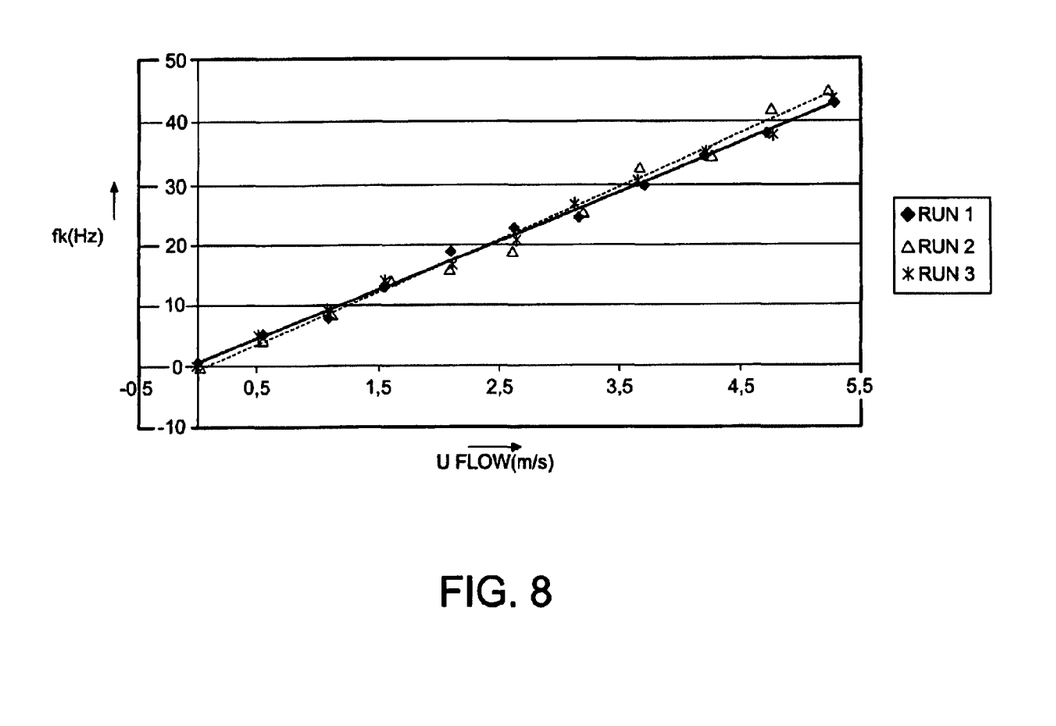
FIG. 8 shows a graph of measured shedding frequency with respect to flow speed, of an example.

FIG. 8 shows a graph of measured shedding frequency $f_K$ with respect to flow speed, of experiments performed with the present embodiment. In this experiment, a flow speed $U_{flow}$ of fluid flowing through the channel C has been set to 11 different predetermined values (from 0 m/s to 5.5 m/s with 0.25 m/s steps) and the resulting FBG sensor signal was being processed to detect the Karman frequency. As follows from FIG. 8, three different test runs all provided the same linear graph of detected frequency $f_K$ versus the flow speed $U_{flow}$. Reliable data can be obtained for low flow rates (0.5 m/s in the present example) as well as high flow rates (5.5. m/s in the present example).

From the above it follows that the present application provides a fiber optic vortex flow meter 1, wherein, in an embodiment, strain resulting from vortex shedding can be measured using a Fiber Bragg Grating (FBG) sensor. This sensor can use a relatively small section of a standard optical fiber 7, so that no downhole electronics are necessary, since the sensor signal can be fed directly to the surface. The advantages of a fiber optic flow meter are that the meter is intrinsically safe and immune to electromagnetic interference. The bluff body 2 can be substantially T-shaped, comprising a truncated triangle part 2A with a long tail part 2B attached to it. The tail part 2B of this body is preferably made as thin as possible, to increase its deformation and therefore the strain measured with the sensor. The flow meter 1 can detect single phase flows (liquid or gas), for example water, steam, or other fluids.

It has been found that the present embodiment can provide an optimal bluff body design with regard to the linearity of the measurement and to the signal quality, wherein the FBG can provide the sensor signal with detectable strain oscillation information over relatively large flow rate velocity ranges. Thus, the sensor can provide accurate flow rate measurements, and is very sensitive to flow rate changes.

Also, for example, the substantially T-shaped body, such as the present embodiment, is an optimum bluff body configuration to generate strain. The deflection of the rectangular plate-like section of the bluff body 2B can be relatively high. Besides, The T-shaped body is also the only shape that can be used to connect a series of flow meters with one fiber. Further it as been found that this shape can provide a very good signal-to-noise ratio of the sensor signal during operation.

In a further embodiment, the fibre part that has been joined with the vortex shedder 2 can comprise other fiber Bragg gratings, for example to detect temperature. In an embodiment, the vortex shedder 2 can be provided with a second fiber Bragg grating FBG2 of the fiber Bragg grating sensor system 3, 7, the second fiber Bragg grating FBG2 being configured to vary a respective fiber Bragg grating sensor signal as a result of perceiving temperature variations. To this aim, a longitudinal direction of the second fiber Bragg grating FBG preferably extends substantially perpendicular with respect to a longitudinal channel direction.

For example, the extra—second—grating FBG2 can be located a shedder location that is not substantially affected by the Karman vortices V. In FIG. 5 two possible locations for a temperature grating are indicated by arrows FBG2. For example a second fiber grating EFBG2 can be provided in a mentioned first section 8a of the curved fiber part 8, or near the entry (and optionally also exit) point near the channel wall 11.

Alternatively, the assembly can be provided with another optical fiber, that does not include a mentioned first grating FBG, but does include a second grating and holds the second grating in the fluid flow to detect fluid temperature.

Besides, according to a further embodiment, the present invention can be used in mass flow determinations, for example following the teachings of the publication "A study of mass flow rate measurement based on the vortex shedding principle" H. Zhang et al., Flow Measurement and Instrumentation 17 (1), 2006, utilizing measurement results of a pressure sensor (not shown in the present application) located upstream with respect to the shedder 2 (and being spaced-apart from the shedder 2).

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

The shedder/bluff body 2 can be dimensioned in various ways and can have various shapes. For example, the first shedder part can have a substantially triangle-shaped cross-section, truncated triangle-shaped cross-section of a different cross-section.

Also, for example, the first part 2A of the bluff body 2 can be attached with only one end to a channel wall 11, or with opposite ends if desired.

Besides, for example, the vortex shedder 2 does not have to include a second part 2B. According to an embodiment, the shedder 2 only includes the first part 2A particularly having the two separation edges t), wherein the first part 2A comprises at least one (first) fiber Bragg grating FBG.

The skilled person will appreciate that the assembly can operate when the shedder 2 extends fully into the channel, or for example in the case that the shedder 2 is only partly inserted into the channel (for example for about 0.25 times a channel diameter/cross-section).

The invention claimed is:

1. An assembly comprising: a fluid channel and a flowmeter, the flowmeter comprising a vortex shedder extending in the fluid channel, the vortex shedder being configured to generate Karman vortices in fluid flowing through the channel during operation, wherein the vortex shedder is provided with a first fiber Bragg grating of a fiber Bragg grating sensor, the provided first fiber Bragg grating being structurally integrated with a pressure variation receiving part of the vortex shedder to detect surface strain induced on the pressure variation receiving part by vortex pressure variations; and
wherein a Karman vortex frequency of the vortices generated by the vortex shedder is detectable utilizing a fiber Bragg grating sensor signal relating to the respective first fiber Bragg grating of that vortex shedder.

2. The assembly according to claim 1, wherein the vortex shedder comprises a bluff body, having two substantially parallel vortex separation edges.

3. The assembly according to claim 2, wherein a first shedder body part, having two substantially parallel vortex separation edges, is fixed to a wall of the fluid channel.

4. The assembly according to claim 2, wherein a distance between the two vortex separation edges, measured transversally with respect to a longitudinal channel direction, is larger than a tenth of a width of the fluid channel, measured in a same direction, wherein the mentioned distance ($D_b$) is preferably smaller than half the width of the channel.

5. The assembly according to claim 4, wherein a length the of bluff body, measured in a transversal channel direction, is substantially equal to a width of the channel, measured in a same direction.

6. The assembly of claim 4 wherein the distance between the two vortex separation edges is about a fourth of the width of the fluid channel.

7. The assembly according to claim 1, wherein the first fiber Bragg grating is spaced-apart from a vortex separation surface of a respective one of the at least one vortex shedder.

8. The assembly according to claim 1, wherein a longitudinal direction of the first fiber Bragg grating encloses an angle smaller than 90° with a fluid flow direction during operation.

9. The assembly of claim 8 wherein the enclosed angle is smaller than 30°.

10. The assembly according to claim 1, wherein the vortex shedder is provided with a pressure variation receiving part that is configured to receive vortex induced pressure variations during operation, wherein the fiber Bragg grating of a respective one of the at least one vortex shedder is arranged to perceive the pressure variations, and to vary the respective fiber Bragg grating sensor signal as a result of perceiving the pressure variations.

11. The assembly according to claim 10, wherein the pressure variation receiving part of the vortex shedder is a fluid dividing element, extending substantially in a longitudinal channel direction and having two fluid pressure receiving surfaces, being faced away from each other, that are configured to alternatively receive vortex induced pressure variations during operation.

12. The assembly according to claim 10, wherein the pressure variation receiving part integrally comprises a curved fiber part, extending at least partly along a curved path and containing the first fiber Bragg grating, wherein a first section of the fiber part preferably extends a short distance from a shedder edge that is faced away from a vortex shedding surface of the vortex shedder, in a substantially orthogonal direction with respect to a longitudinal channel direction, wherein a second section of the fiber part is preferably located near a vortex shedding surface of the vortex shedder and extends substantially parallel to the longitudinal channel direction.

13. The assembly according to claim 10, wherein the pressure variation receiving part of the vortex shedder has a substantially rectangular shape, comprising two transversal sides that are spaced-apart from opposite longitudinal flow restriction parts, wherein a distance between each transversal side of the rectangular vortex shedder part and an opposite longitudinal flow restriction part is in a range of about 0.1-10 mm.

14. The assembly of claim 13 wherein the distance between each transversal side of the rectangular vortex shedder part and an opposite longitudinal flow restriction part is about 1-2 mm.

15. The assembly according to claim 10, wherein a thickness of the pressure variation receiving part is smaller than about 10 mm.

16. The assembly of claim 15 wherein the thickness of the pressure variation receiving part is in the range of about 1-2 mm.

17. The assembly of claim 10 wherein the pressure variations are perceived via pressure variation induced surface strain variations of the pressure variation receiving part of the vortex shedder.

18. The assembly according to claim 1, wherein the vortex shedder has a substantially T-shaped cross-section wherein the vortex shedder is made of rigid, corrosive resistant material.

19. The assembly of claim 18 wherein the vortex shedder is made of rigid, corrosion resistant material.

20. The assembly according to claim 1, wherein the vortex shedder is provided with a second fiber Bragg grating of the fiber Bragg grating sensor, the second fiber Bragg grating being configured to vary a respective fiber Bragg grating sensor signal as a result of perceiving temperature variations.

21. The assembly of claim 20, wherein a longitudinal direction of the second fiber Bragg grating extends substantially perpendicular with respect to a longitudinal channel direction.

22. The assembly according to claim 1, comprising a plurality of spaced-apart vortex shedders, each vortex shedder is provided with a mentioned first fiber Bragg grating of the fiber Bragg grating sensor, and wherein a single fiber is provided with the first fiber Bragg gratings.

23. A flowmeter adapted to be inserted into a fluid channel, the flowmeter comprising:
a vortex shedder extending in the fluid channel, the vortex shedder being configured to generate Karman vortices in fluid flowing through the fluid channel during operation, wherein the vortex shedder is provided with a first fiber Bragg grating of a fiber Bragg grating sensor, the provided first fiber Bragg grating being structurally integrated with a pressure variation receiving part of the vortex shedder to detect surface strain induced on the pressure variation receiving part by vortex pressure variations;
the flowmeter being adapted to measure a fluid flow rate in the fluid channel by determining the Karman vortex frequency of vortices shed by the vortex shedder during operation, utilizing a respective fiber Bragg grating sensor signal relating to the respective first fiber Bragg grating of the vortex shedder.

24. A method for measuring a fluid flow rate, of fluid flowing through a channel, the method comprising:
Providing a vortex shedder in the channel, the vortex shedder shedding Karman vortices in fluid flowing through the channel, from respective vortex shedding edges;
providing the vortex shedder with a fiber having at least one first fiber Bragg grating, the provided first fiber Bragg grating being structurally integrated with a pressure variation receiving part of the vortex shedder to detect surface strain induced on the pressure variation receiving part by vortex pressure variations and configured to reflect an optical signal of a certain wavelength depending on an amount of strain to which the grating is being subjected, wherein fluid pressure variations that result from the Karman vortices lead to a varying strain being subjected to the respective fiber Bragg grating;
transmitting an optical signal into the fiber, the signal having a wavelength to be at least partly reflected by the first fiber Bragg grating in the case that the grating is being subjected to a predetermined amount of strain;
detecting the optical signal that is reflected by the first fiber Bragg grating of the vortex shedder; and
processing the detected optical signal to determine the fluid flow rate from the variations of the detected optical signal.

25. The method according to claim 24, further comprising: measuring surface strain variations of a surface part of the vortex shedder utilizing the fiber Bragg grating.

* * * * *